(12) United States Patent
Lucas et al.

(10) Patent No.: US 7,519,854 B2
(45) Date of Patent: Apr. 14, 2009

(54) INTERNAL FAILOVER PATH FOR SAS DISK DRIVE ENCLOSURE

(75) Inventors: Gregg S Lucas, Tucson, AZ (US); Yoshihiko Terashita, Kanagawa-ken (JP); Kenneth R Schneebeli, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/251,392

(22) Filed: Oct. 14, 2005

(65) Prior Publication Data

US 2007/0088978 A1    Apr. 19, 2007

(51) Int. Cl.
*G06F 11/00* (2006.01)
(52) U.S. Cl. ............................................. 714/9; 714/43
(58) Field of Classification Search ...................... 714/9, 714/43
See application file for complete search history.

(56) References Cited

U.S. PATENT DOCUMENTS

| | | |
|---|---|---|
| 6,009,535 A | 12/1999 | Halligan et al. |
| 6,330,687 B1 | 12/2001 | Griffith |
| 6,578,158 B1 | 6/2003 | Deitz et al. |
| 6,732,289 B1 | 5/2004 | Talagala et al. |
| 2005/0050381 A1 | 3/2005 | Maddock |
| 2005/0097402 A1 | 5/2005 | Baba |
| 2006/0020711 A1 * | 1/2006 | Nguyen et al. ............... 709/238 |

\* cited by examiner

*Primary Examiner*—Scott T. Baderman
*Assistant Examiner*—Jigar Patel
(74) *Attorney, Agent, or Firm*—Dan Shifrin

(57) ABSTRACT

A serial SCSI (SAS) storage drive system includes a drive enclosure having a first interface card coupled to one storage controller over a single SAS path and a second interface card coupled to another storage controller over a different single SAS path. At least one disk drive within the enclosure is assigned to the first storage controller and interconnected to the storage controller through the first interface card. At least a second disk drive within the enclosure is assigned to the second storage controller and interconnected to the storage controller through the second interface card. The interface cards are selectively interconnected with each other through a crossover port. In the event of a failure in a storage controller or an interface card, the crossover port may be activated, thereby maintaining access to both sets of disk drives.

10 Claims, 3 Drawing Sheets

INTERNAL FAILOVER PATH FOR SAS DISK DRIVE ENCLOSURE

TECHNICAL FIELD

The present invention relates generally to data storage systems and, in particular, to high availability serial attached SCSI (SAS) storage systems.

BACKGROUND ART

A relatively new generation of disk drive interface is the serial attached SCSI (SAS) architecture. The architecture is a point-to-point architecture using serial communication directly from the controller to a disk drive or through an expander switching matrix. Multiple devices can be connected at the same time. In contrast, conventional SCSI devices used a slower parallel communication using shared-access topologies in which only two devices are able to communicate at one time. However, SAS uses the conventional SCSI commands. Some additional benefits of the SAS architecture include convenient redundancy through the use of dual-ported disk drives, smaller form factor drives, thinner cables and smaller cable connectors.

One common configuration which addresses a need for high availability is illustrated in FIG. 1. A host device 102 is coupled to two storage controllers 104A, 104B, such as RAID controllers, which may also be known as initiators. The storage controllers 104A, 104B, in turn, are each coupled through SAS paths to both ports of a dual-port drive enclosure 110. Within the enclosure 110 are multiple disk drives 112 and two interface cards 116A, 116B, each of which includes an expander or switch module 118A, 118B. Each disk drive 112 is connected to one of the expanders 118A, 118B through one of two of the drive ports 114A, 114B. Connecting each controller 104A, 104B with each of the interface cards 116A, 116B permits maintenance of full operation of the drives 112 in the event that one of the storage controllers 104A, 104B or one of the interface cards 116A, 116B fails. An additional downstream enclosure 150 may be connected to the first enclosure 110 through additional dual SAS paths, with further downstream enclosures (not shown) connected in a trunk (daisy chain) topology. Alternatively, additional enclosures may each be connected to the first enclosure 110 in a star topology.

Despite the benefits of SAS technology, it remains desirable to further increase the density of disk drives relative to the volume of an enclosure while still maintaining full redundancy.

SUMMARY OF THE INVENTION

The present invention provides a serial SCSI (SAS) storage drive system including a drive enclosure having a first interface card coupled to one storage controller over a single SAS path and a second interface card coupled to another storage controller over a different single SAS path. At least one disk drive within the enclosure is assigned to the first storage controller and interconnected to the storage controller through the first interface card. At least a second disk drive within the enclosure is assigned to the second storage controller and interconnected to the storage controller through the second interface card. The interface cards are selectively interconnected with each other through a crossover port. In the event of a failure in a storage controller or an interface card, the crossover port may be activated, thereby maintaining access to both sets of disk drives.

Full access to disk drives in downstream attached enclosures may also be maintained through the crossover port in the first enclosure and in the downstream enclosures.

DETAILED DESCRIPTION OF THE PREFERRED EMBODIMENT

Figure 1:
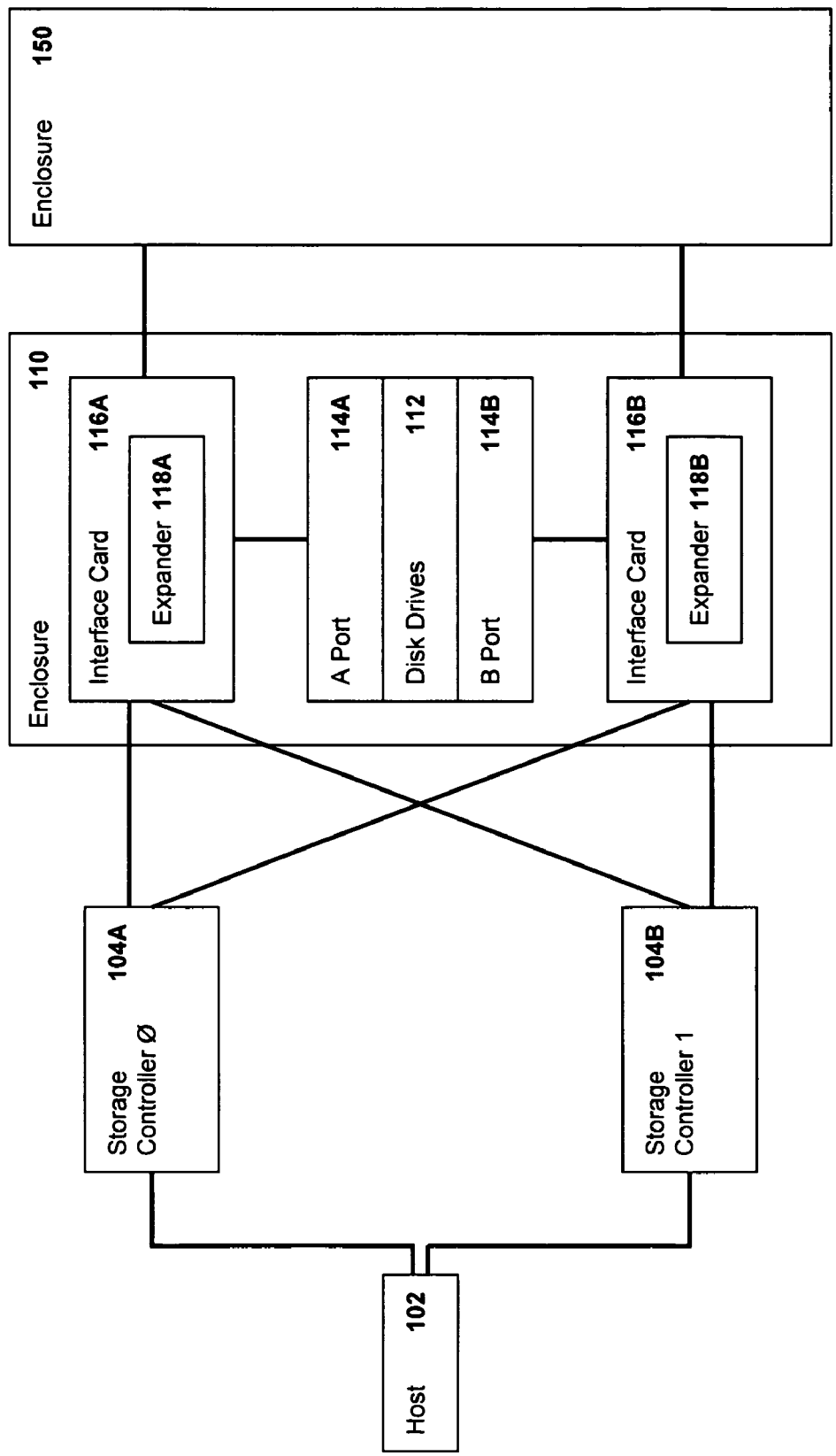
FIG. 1 is a block diagram of a prior art configuration of an SAS storage system.
Figure 2:
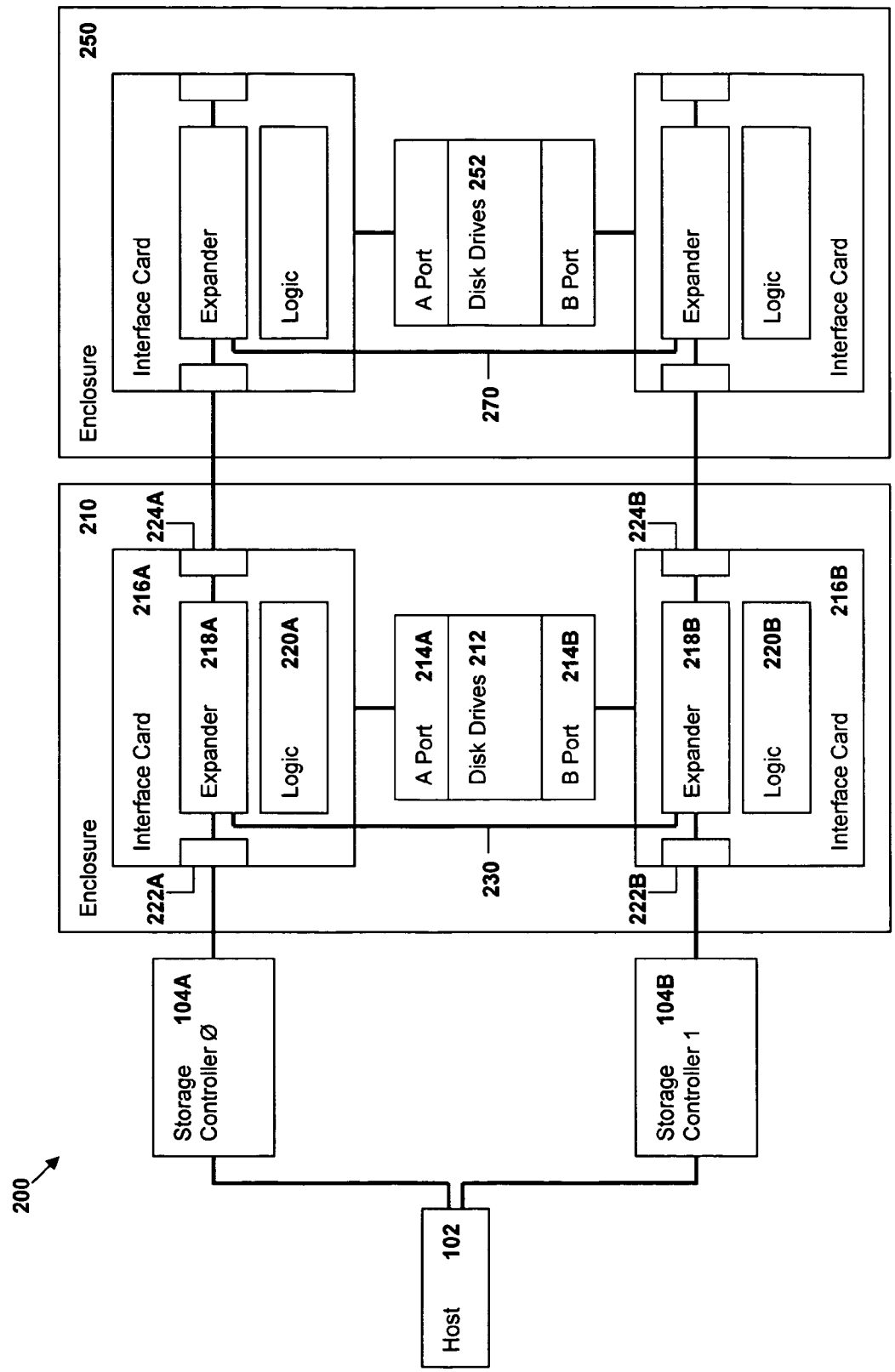
FIG. 2 is a block diagram of a configuration of an SAS storage system of the present invention.

FIG. 2 is a block diagram of a configuration of a serial attached SCSI (SAS) storage system 200 of the present invention. A host device 102 is attached to two storage controllers 104A, 104B, such as RAID controllers, which may also be known as initiators. The system 200 further includes one or more SAS drive enclosures 210, 250. Additional enclosures may be attached in a trunk topology or in a star topology. Within the enclosure 210 are multiple disk drives 212, each with two drive ports 214A, 214B. Also within the enclosure 210 are two interface cards 216A, 216B. The interface cards 216A, 216B each include an expander or switch module 218A, 218B and a processor or control logic 220A, 220B.

One storage controller 104A is coupled to only one of the interface cards 216A over an SAS path through an appropriate SAS port 222A while the other controller 104B is similarly coupled to only the other interface card 216B over another SAS path through another SAS port 222B. The interface cards within the second enclosure 250 are coupled to the interface cards 216A, 216B within the first enclosure 210 over SAS paths through additional connectors 224A, 224B on the interface cards 216A, 216B, respectively.

The term "attach" is commonly used in the industry to refer to a functional relationship between two devices in which the devices may or may not be physically connected directly to each other. Rather, the devices may be attached directly, through a network, or through one or more intermediate devices, components or systems. Consequently, as used herein, "attach", "couple" and "connect" do not necessarily require a direct physical connection.

Rather than connect each storage controller 104A and 104B to both interface cards 216A and 216B, the present invention provides a crossover port 230 selectively interconnecting the two expanders 218A, 218B. Consequently, fewer connectors and cables are required, thereby saving space within the enclosure 210 and fewer external SAS ports are required, thereby saving cost. The internal configuration of the second enclosure 250 is the same as the configuration of the first enclosure 210.

During normal operations, the crossover port 230 is in an inactive state. The first interface card 216A is configured to permit the attached storage controller 104A to access at least one of the disk drives 212 through port A 214A. Similarly, the second interface card 216B is configured to permit the attached storage controller 104B to access at least one of the other disk drives 212 through port B 214B. A controller function executed by the control logic 220A, 220B on each interface card 216A, 216B monitors data flow and identifies failures which would prevent access by the attached controller 104A or 104B to the disk drives 212 through the appropriate port 214A, 214B. Such failures may occur in an interface card 216A, 216B, including the expander 218A, 218B, or may occur in a storage controller 104A, 104B. A detected failure is reported over an SAS path to one or both of the storage controllers 104A, 104B which then determine whether to initiate a failover.

If a failover is initiated, the crossover port 230 is activated by one of the storage controllers 104A, 104B transmitting appropriate instructions over an SAS path to one of the expanders 218A, 218B, thereby interconnecting the two interface cards 216A, 216B.

If the failure occurs in the first storage controller 104A, which accesses at least one of the disk drives 212 attached through the first interface card 216A and port A 214A, the activated crossover port 230 permits the second storage controller 104B to access the disk drives previously assigned to the first storage controller 104A through the first interface card 216A. Similarly, if the failure occurs in the second storage controller 104B, which accesses a different set of the disk drives 212 attached through the second interface card 216B and port B 214B, the crossover port 230 permits the first storage controller 104A to access the disk drives previously assigned to the second storage controller 104B through the second interface card 216B.

Figure 3:
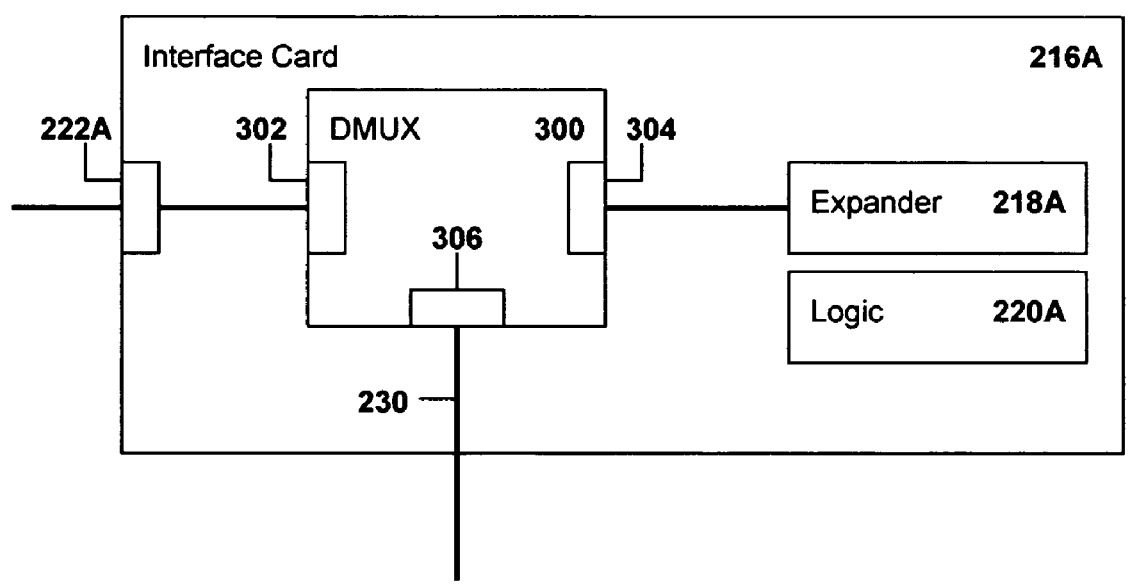
FIG. 3 is a block diagram of an alternate embodiment of an interface card of the present invention.

If the failure occurs in the first interface card 216A, which then inhibits the first storage controller 104A accessing the first set of disk drives through the port A 214A, the first interface card 216A may still be sufficiently operative to permit the storage controller 104A to redirect SAS traffic through the activated crossover port 230 to the first set of disk drives. It is possible that the first interface card 216A has not failed but, rather, a downstream component has failed such that the first interface card 216A is unable to communicate with its counterpart in the second enclosure 250, thus preventing access to downstream disk drives. In such event, the storage controller 104A will be able to route its SAS traffic through the activated crossover port 230. In a further embodiment (FIG. 3), a demultiplexer 300 may be installed between the first expander 218A and the connectors 222A. The demultiplexer 300 includes a first second and third data terminals 302, 304 and 306, coupled respectively to the first storage controller 104A, the first expander 218A and the crossover port 230. The demultiplexer 300 preferably directs SAS traffic to and from the first expander 218A in the absence of a failure in the first interface card 216A. In the event of such a failure, a deadman timer in the logic 220A may automatically activate the demultiplexer 300 to direct the traffic to and from the crossover port 230. Failures in the second interface card 216B are processed in a corresponding fashion.

Moreover, if a failure occurs in the first interface card 216A, the disk drives 252 in the second enclosure 250 which were assigned to the first storage controller 104A may still be accessed by the first storage controller 104A when the crossover ports 230, 270 in both enclosures 210, 250 are activated. Similarly, if a failure occurs in the second interface card 216B, the disk drives 252 in the second enclosure 250 which were assigned to the second storage controller 104B may still be accessed by the second storage controller 104B when the crossover ports 230, 270 in both enclosures 210, 250 are activated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for operating an SAS storage drive system.

What is claimed is:

1. A serial SCSI (SAS) storage drive system, comprising a first SAS drive enclosure comprising:
   a first plurality of storage drives;
   first and second interface cards;
   a first SAS expander programmable to couple the first interface card with at least a first of the first plurality of storage drives through a first port;
   a second SAS expander programmable to couple the second interface card with at least a second of the plurality of storage drives through a second port;
   a first crossover port selectively interconnecting the first interface card with the second interface card;
   the first interface card comprising a first demultiplexer having a first data terminal coupled to the first storage controller, a second data terminal coupled to the first expander and a third data terminal coupled to the first crossover port;
   the second interface card comprising a second demultiplexer having a first data terminal coupled to the second storage controller, a second data terminal coupled to the first expander and a third data terminal coupled to the first crossover port; and
   logic associated with each interface card programmed to detect when a failure has occurred in the first or second storage controller;
   the logic associated with the first interface card being programmed to:
      direct the first demultiplexer to interconnect the first and second data terminals of the first interface card in the absence of a failure in the first storage controller; and
      direct the first demultiplexer to interconnect the first and third data terminals of the first interface card when a failure in the first storage controller is detected; and
   the logic associated with the second interface card being programmed to:
      direct the second demultiplexer to interconnect the first and second data terminals of the second interface card in the absence of a failure in the second storage controller; and
      direct the second demultiplexer to interconnect the first and third data terminals of the second interface card when a failure in the second storage controller is detected;
   whereby:
      if the failure occurred in the first storage controller, the second storage controller is coupled to the first interface card, whereby access to the at least first storage drive is maintained; and if the failure occurred in the second storage controller, the first storage controller is coupled to the second interface card, whereby access to the at least second storage drive is maintained.

2. The SAS drive system of claim 1, wherein:
the logic associated with each interface card is further programmed to detect when a failure has occurred in the first or second interface card;
the logic associated with the first interface card is further programmed to:
  direct the first demultiplexer to interconnect the first and second data terminals of the first interface card in the absence of a failure in the first interface card; and
  direct the first demultiplexer to interconnect the first and third data terminals of the first interface card when a failure in the first interface card is detected; and
the logic associated with the second interface card is further programmed to:
  direct the second demultiplexer to interconnect the first and second data terminals of the second interface card in the absence of a failure in the second interface card; and
  direct the second demultiplexer to interconnect the firs and third data terminals of the second interface card when a failure in the second interface card is detected;
whereby:
  if the failure occurred in the first interface card, the first storage controller is coupled to the second interface card, whereby access to the at least first storage drive is maintained; and
  if the failure occurred in the second interface card, the second storage controller is coupled to the first interface card, whereby access to the at least second storage drive is maintained.

3. The SAS drive system of claim 1, wherein the first crossover port interconnects the first SAS expander within the first interface card with the second SAS expander within the second interface card.

4. The SAS drive system of claim 1, further comprising a second SAS drive enclosure, comprising:
a second plurality of storage drives;
third and fourth interface cards;
a third SAS expander programmable to couple the third interface card with at least a first of the second plurality of storage drives through a third port;
a fourth SAS expander programmable to couple the fourth interface card with at least a second of the second plurality of storage drives through a fourth port;
a second crossover port selectively interconnecting the third interface card with the fourth interface card;
the third interface card comprising a third demultiplexer having a first data terminal coupled to the first interface card, a second data terminal coupled to the third expander and a third data terminal coupled to the third crossover port;
the fourth interface card comprising a fourth demultiplexer having a first data input coupled to the second interface card, a second data terminal coupled to the fourth expander and a third data terminal coupled to the second crossover port; and
logic associated with each of the third and fourth interface cards programmed to:
  detect when a failure has occurred in the first or second storage controller;
the logic associated with the third interface card being programmed to:
  direct the second demultiplexer to interconnect the first and second data terminals of the third interface card in the absence of a failure in the first storage controller; and
  direct the third demultiplexer to interconnect the first and third data terminals of the third interface card when a failure in the first storage controller is detected; and
the logic associated with the second interface card being programmed to:
  direct the second demultiplexer to interconnect the first and second data terminals of the third interface card in the absence of a failure in the first storage controller; and
  direct the third demultiplexer to interconnect the first and third data terminals of the fourth interface card when a failure in the second storage controller is detected;
whereby:
  if the failure occurred in the first storage controller, the second storage controller is coupled to the third interface card, whereby access to the at least first of the second plurality storage drives is maintained;
  if the failure occurred in the second storage controller, the first storage controller is coupled to the fourth interface card, whereby access to the at least second of the second plurality storage drives is maintained.

5. The SAS drive system of claim 4, wherein:
the logic associated with each of the third and fourth interface cards is further programmed to detect when a failure has occurred in the third or fourth interface card;
the logic associated with the third interface card is further programmed to:
  direct the third demultiplexer to interconnect the first and second data terminals of the third interface card in the absence of a failure in the third interface card; and
  direct the third demultiplexer to interconnect the first and third data terminals of the third interface card when a failure in the third interface card is detected; and
the logic associated with the fourth interface card is further programmed to:
  direct the fourth demultiplexer to interconnect the first and second data terminals of the fourth interface card in the absence of a failure in the fourth interface card; and
  direct the fourth demultiplexer to interconnect the first and third data terminals of the fourth interface card when a failure in the fourth interface card is detected;
whereby:
  if the failure occurred in the third interface card, the first storage controller is coupled to the fourth interface card, whereby access to the at least first of the second plurality of storage drives is maintained; and
  if the failure occurred in the fourth interface card, the second storage controller is coupled to the third interface card, whereby access to the at least second of the second plurality of storage drives is maintained.

6. The SAS drive system of claim 4, wherein the the logic associated with the third and fourth interface cards is further responsive to detection of a failure in the first or second interface card to activate the second crossover port whereby:
  if the failure occurred in the first interface card, the first storage controller remains coupled to the third interface card; and if the failure occurred in the second interface card, the second storage controller remains coupled to the fourth interface card.

7. A method for operating a serial SCSI (SAS) storage drive system, comprising:
providing a first SAS drive enclosure having first and second interface cards, first and second SAS expanders associated with the first and second interface cards, respectively, a first plurality of storage drives, and a first crossover port selectively interconnecting the first and second expanders;
attaching a first storage controller to the first interface card through a first SAS path;
attaching a second storage controller to the second interface card through a second SAS path;
configuring the first SAS expander to permit access to at least a first of the first plurality of storage drives by the first storage controller;
configuring the second SAS expander to permit access to at least a second of the first plurality of storage drives by the second storage controller;
providing a first demultiplexer in the first interface card, the first demultiplexer having a first data terminal coupled to the first storage controller, a second data terminal coupled to the first expander and a third data terminal coupled to the first crossover port;
providing a second demultiplexer in the second interface card, the second multiplexer having a data input coupled to the second storage controller, a first output coupled to the first expander a second output coupled to the first crossover port;
directing the first demultiplexer to interconnect the first and second data terminals of the first interface card in the absence of a failure in the first interface card;
directing the second demultiplexer to interconnect the first and second data terminals of the second interface card in the absence of a failure in the second interface card;
performing normal file operations on data stored on the at least first and at least second storage drives with the first crossover port in a deactivated state;
detecting a failure in the first or second storage controller; and
in response to the detected failure in the first or second storage controller:
directing the first demultiplexer to interconnect the first and second data terminals of the first interface card in the absence of a failure in the first interface card;
directing the second demultiplexer to interconnect the first and third data terminals of the second interface card when a failure in the second interface card is detected;
whereby:
if the failure occurred in the first storage controller, the second storage controller is coupled to the first interface card to maintain access to the at least first storage drive; and
if the failure occurred in the second storage controller, the first storage controller is coupled to the second interface card to maintain access to the at least second storage.

8. The method of claim 7, further comprising:
directing the first demultiplexer to interconnect the first and second data terminals of the first interface card in the absence of a failure in the first interface card;
directing the second demultiplexer to interconnect the first and second data terminals of the second interface card in the absence of a failure in the second interface card;

detecting a failure in the in the first or second interface cards;
directing the first demultiplexer to interconnect the first and third data terminals of the first interface card when a failure in the first interface card is detected;
directing the second demultiplexer to interconnect the first and third data terminals of the second interface card when a failure in the second interface card is detected;
whereby:
if the failure occurred in the first interface card, the first storage controller is coupled to the second interface card to maintain access to the at least first storage drive; and
if the failure occurred in the second interface card, the second storage controller is coupled to the first interface card to maintain access to the at least second storage drive.

9. The method of claim 7, further comprising:
providing a second SAS drive enclosure having third and fourth interface cards, third and fourth SAS expanders associated with the third and fourth interface cards, respectively, a second plurality of storage drives, and a second crossover port selectively interconnecting the third and fourth expanders;
attaching the first interface card to the third interface card through a third SAS path;
attaching the second interface card to the fourth interface card through a fourth SAS path;
configuring the third SAS expander to permit access to at least a first of the second plurality of storage drives by the first storage controller;
configuring the fourth SAS expander to permit access to at least a second of the second plurality of storage drives by the second storage controller;
performing normal file operations on data stored on the at least first and at least second storage drives of the second plurality with the second crossover port in a deactivated state;
detecting a failure in the first or second interface cards; and
in response to the detected failure in the first or second interface card, activating the first and second crossover ports, whereby:
if the failure occurred in the first interface card, the first storage controller is coupled to the fourth interface card to maintain access to the at least first of the second plurality of storage drives; and
if the failure occurred in the second interface card, the second storage controller is coupled to the third interface card to maintain access to the at least second of the second plurality of storage drives.

10. The method of claim 9, further comprising:
detecting when a failure has occurred in the third or fourth interface card; and
in response to the detected failure in the third or fourth interface card activating the second crossover port, whereby:
if the failure occurred in the third interface card, the first storage controller is coupled to the fourth interface card, whereby access to the at least first of the second plurality of storage drives is maintained; and
if the failure occurred in the fourth interface card, the second storage controller is coupled to the third interface card, whereby access to the at least second of the second plurality of storage drives is maintained.

* * * * *